United States Patent [19]

Pioch et al.

[11] Patent Number: 4,834,902

[45] Date of Patent: May 30, 1989

[54] PROCESS FOR THE PRODUCTION OF FREE-FLOWING ALKALINE DETERGENTS BY COMPACTING GRANULATION

[75] Inventors: Lothar Pioch, Duesseldorf; Dieter Jung, Hilden; Jochen Jacobs, Wuppertal; Elmar Wilms, Dormagen, all of Fed. Rep. of Germany

[73] Assignee: Henkel Kommanditgesellschaft auf Aktien, Duesseldorf, Fed. Rep. of Germany

[21] Appl. No.: 171,609

[22] Filed: Mar. 22, 1988

[30] Foreign Application Priority Data

Mar. 23, 1987 [DE] Fed. Rep. of Germany ....... 3709488

[51] Int. Cl.$^4$ ........................... B01J 2/22; C11D 3/08

[52] U.S. Cl. ............................... 252/135; 23/313 AS; 252/35; 252/14 D; 252/174.25; 264/109; 264/117; 264/118

[58] Field of Search ................... 252/135, 140, 174.25; 264/109, 117, 118; 23/313 AS

[56] References Cited

U.S. PATENT DOCUMENTS

| | | | |
|---|---|---|---|
| 4,071,377 | 1/1978 | Schwuger et al. | 252/131 |
| 4,333,771 | 6/1982 | Altewscopfer et al. | 252/90 |
| 4,430,246 | 2/1984 | Sorbe | 252/140 |

FOREIGN PATENT DOCUMENTS

| | | |
|---|---|---|
| 0253323 | 1/1988 | European Pat. Off. . |
| 3624336 | 7/1986 | Fed. Rep. of Germany . |

*Primary Examiner*—A. Lionel Clingman

*Attorney, Agent, or Firm*—Ernest G. Szoke; Wayne C. Jaeschke; Real J. Grandmaison

[57] ABSTRACT

To produce granular, free-flowing detergents containing sodium metasilicate, pentasodium triphosphate or zeolite NaA or a triphosphate/zeolite mixture, at least two of the components are first agglomerated and mixed as a granular preagglomertate with other components present in powder form and compacted by means of rolls, the pressure limit beyond which no further compaction is obtained not being significantly exceeded. The compactate is then size-reduced to the desired particle size.

10 Claims, No Drawings

PROCESS FOR THE PRODUCTION OF FREE-FLOWING ALKALINE DETERGENTS BY COMPACTING GRANULATION

BACKGROUND OF THE INVENTION

1. Field of the Invention

Hitherto, an essential constituent of commercial detergents for use in machine washing processes, for example in domestic dishwashing machines, has generally been sodium metasilicate in admixture with sodium tripolyphosphate (also known as pentasodium triphosphate and referred to hereinafter as STP). Soda and waterglass in particular are used as further constituents along with other components designed to enhance the granulating and/or detergent effect. The mixtures are made up as free-flowing agglomerates, the properties of the product having to meet a number of requirements.

The detergent mixtures are generally strongly alkaline and hence take the breath away. Accordingly, the presence in the product of dust-like fines, as might be expected where powder-form raw materials are used, has to be strictly avoided. In addition, products of this type with a high proportion of fines tend to cake or clump on contact with water in the dispensing compartment of the dishwashing machine, so that there is no guarantee of a sufficiently short dispensing time.

In addition to dispensability and freedom from dust, other important evaluation criteria are the powder density of the detergents and their stability in storage. The powder density should be above 900 g/l to enable the quantity of product required for the washing process to be readily introduced into the dispensing compartment. Since the free-flowing agglomerates contain water, it is necessary during processing of the formulation to ensure that the water remains bound in substantially crystalline form to prevent the granulates from caking in storage.

Commercial detergents are presently produced by two processes, namely, either by mixing granulation, or by mixing up of granulated dust-free raw materials.

Mixing granulation in the presence of water involves a number of difficulties which necessitate careful control of the process. In water-moist granulation, various components of the mixture (particularly STP, anhydrous metasilicate and soda) compete with one another to bind the free water present. Thermodynamically the most stable composition may possibly be achieved only during storage of the products through variable raw-material properties or process conditions which have not been strictly observed. The migration of the water required to that end is generally accompanied by clumping or caking of the product.

The flexibility of mixing granulation in regard to the formulations used is also relatively poor, particularly in one specific direction, namely: the replacement of relatively large amounts of the STP by the finely divided, crystalline zeolite NaA desirable for environmental involves difficulties. In particular, the products obtained in this case are often too low in density and have unsatisfactory dispensing properties. Where mixing granulation is carried out in corresponding machines with high energy consumption, for example Lödige mixers, the product sticks to the mixer walls so that the mixer has to be cleaned at regular intervals. Soda and waterglass have to be used as granulation aids although they make no significant contribution towards the effectiveness of the detergent formulation.

Although the production of mixed products in accordance with the prior art avoids some of the above-mentioned disadvantages of mixing granulation, it has hitherto still been necessary to use pregranulated and hence very expensive raw materials to produce ultimately dust-free mixed products.

2. Discussion of Related Art

Earlier German patent application No. 36 24 336 relates to a process for the production of granular, free-flowing alkaline detergents based on sodium metasilicate in intimate admixture with pentasodium triphosphate and/or finely divided crystalline zeolite NaA as enhancing builders and, if desired, other auxiliaries for an enhanced granulating and/or detergent effect by means of a mixing process, the process being characterized in that the starting components of the mixture are mixed with one another in powder form, the resulting mixture is compacted under high pressure in a roll gap and the compactate obtained is size-reduced to the desired grain size. The pressure limits beyond which no further compaction is obtained are not significantly exceeded in the roll gap. More particularly, the material to be granulated is converted under pressure in the roll gap of a pair of rolls rotating in opposite directions at substantially the same peripheral speed into a sheet-form compactate which is then size-reduced to the desired grain size. It is possible by this process readily to obtain strongly alkaline detergent mixtures of the type in question here in the form of free-flowing, dust-free products which are distinguished in use by their high specific density and their favorable dispensability in standard dishwashing machines. At the same time, the free-flowing products obtained are stable in storage and, in particular, show no tendency towards caking, even in the event of prolonged storage.

The further development of this teaching within the scope of the present invention is concerned with further simplification of the process in cases where the production of the compactate as a whole involves the use of, in particular, finely powered components of which the uniform incorporation in the mixture and subsequent processing in the roll gap to form the compactate can give rise to difficulties.

It has been found that, for example, the zeolite NaA used as a phosphate substitute can give rise to unwanted process difficulties where it is to be used in the form of a fine, spray-dried powder of the type now commercially available for the production of detergents containing zeolite NaA. The use of a generally spray-dried zeolite material such as this can be problematical, particularly in industrial plants, on account of its poor flow properties and its very fine powder structure, resulting in for example dosing problems, the blockage of powder paths or the extraction of fines via the in-plant dust extraction system. In addition, poorly-flowing powders with a tendency to cake can also cause difficulties. Occasionally they are not fully taken in by the rolls, so that the rolls have to be force-fed by a screw or similar machine. However, force feeding can be undesirable precisely in the case of formulations which contain, for example, hydrated metasilicates or other components fusible or plasticizable at relatively low temperatures, because in that case the material to be compacted is in danger of partial plasticization under the effect of the general increase in temperature in the compression zone of the tamping screw, resulting in caking in the region of the screw and on the walls. This is often accompanied by a further increase in temperature through increased friction which can result, for example, in damage to organic components or in the undesirable release of water of crystallization.

An object of the present invention is to produce a granulated detergent composition having good free-flow and dispensing properties and high stability in storage using inexpensive raw materials while at the same time reducing the disadvantages of water-moist mixing granulation. In addition to the processibility of hitherto standard formulations for detergents of the type in question, the invention also seeks to enable finely divided crystalline zeolite NaA to be used instead of or in addition to STP and other components, for example detergency enhancers, to be co-used.

According to the present invention, the afore-mentioned process-related disadvantages can be considerably alleviated through the inclusion of relatively high proportions of already granulated, free-flowing components in the mixture of raw materials.

DESCRIPTION OF THE INVENTION

Other than in the operating examples, or where otherwise indicated, all numbers expressing quantities of ingredients or reaction conditions used herein are to be understood as modified in all instances by the term "about".

The present invention relates to a process for the production of granular, free-flowing alkaline detergent compositions containing sodium metasilicates in intimate admixture with pentasodium triphosphate (STP) and/or finely divided crystalline zeolite NaA as enhancing builders and, if desired, other auxiliaries for an improved granulating and/or detergent effect by means of a mixing process in which the starting components of the mixture are mixed with one another, the resulting mixture is compacted under high pressure in a roll gap and the compactate obtained is size-reduced to the desired grain size, characterized in that at least two of the mixture components to be compacted are agglomerated with one another in a preliminary process step and are introduced as a granular preagglomerate into the mixture to be compacted in a roll gap.

According to the invention, the finely powdered mixture constituents in particular are included in the production of the granular preagglomerates, being worked up with other mixture components to form the granular preagglomerate, optionally using water. In general, the preagglomerates have lower solids densities than the end products of the compacting process after compaction in a roll gap. One particular advantage of the process according to the invention is that there is no need to establish specific solids densities in the production of the preagglomerates. Instead, the desired adjustment of high solid densities of preferably above 1.8 g/cm$^3$ takes place during the subsequent compacting step in a roll gap.

Any suitable simple agglomeration process may be used to produce the preagglomerates from finely-divided mixture constituents. In practice, the techniques best suited to the particular application are selected. In one embodiment, a particularly simple method is based on a spray-drying process, in which the preagglomerate is obtained in the form of a free-flowing powder of ultra-fine powders in admixture with solutions and/or suspensions of other mixture components in water.

Thus, free-flowing, already granular spray-dried products which may contain other finely divided components, for example STP and/or soda, in addition to zeolite NaA may be used, for example, as mixture components for the compacting process in accordance with the teaching of German patent application No. 36 24 336. It is of course also possible to preagglomerate STP and/or soda alone in such a form. In this connection, it is advisable, particularly for reasons of cost, to incorporate other auxiliaries, for example detergency-enhancing components, such as nitrilotriacetic acid (NTA) and/or polymeric carboxylic acids or sodium salts thereof, for example the copolymer of acrylic acid and maleic acid commercially available as "Sokalan CP 5", through the spray tower because, in this way, these auxiliaries can be used in the form of the distinctly less expensive corresponding solutions rather than as powders and, at the same time, still afford the above mentioned process advantages for the process as a whole. In addition, it has been found that auxiliary components of the type in question can in turn contribute significantly towards the development of the particle structure during the spray-drying process.

With the process according to the invention, difficulties can easily be avoided particularly when completely phosphate-free formulations are to be produced as the high-density compactate, necessitating the use of relatively large quantities of very finely powdered zeolite. It has been found that, through the choice and adaptation of the components in the preagglomeration step, the compacting granulation according to the teaching of the above-mentioned application always leads to products of acceptable granulometry and performance properties.

The teaching of the invention includes a procedure in which all the components of the final composition are processed to one or more preagglomerates which are then mixed with one another where necessary and compacted in a roll gap. To this end, the material to be granulated is passed under compression through the gap between a pair of rolls rotating in opposite directions at substantially the same peripheral speed and, in the process, are compacted into a sheet-form compactate.

The roll compaction may be effected with or without precompression of the powder-form premix. The pair of rolls may be arranged in any spatial direction, i.e. in particular vertically or horizontally to one another. The powder-form material is then delivered to the roll gap either by gravity feeding or by means of a suitable machine, for example by means of a tamping screw.

The pressure applied in the roll gap and the residence time of the material under that pressure have to be adjusted to such levels that a well-developed, hard sheet-form compactate of high density is obtained. The high degree of compression is desired in order to adjust the required powder density of the free-flowing material ultimately obtained which should be above 900 g/l. The abrasion stability of the granulate is also influenced by the degree of compaction, high degrees of compaction giving abrasion-resistant granulates which are also desirable. At the same time, however, it is important to bear in mind that excessive compression jeopardizes the safety of the process because, if it is applied, the material is plasticized on the rolls and causes sticking. This unwanted effect occurs whenever an increase in compression produces no further compaction of the material and the additional pressure then applied results primarily in heating and plasticization of the material, for example through partial melting of aqueous constituents, particularly hydrated metasilicate.

The particular optimal pressure applied depends on the formulation. According to the invention, a specific pressure of from about 10 to 30 kN/cm roll length is normally applied in the roll gap, a specific pressure of from about 15 to 25 kN/cm roll length being particularly preferred.

The solids densities obtained in the compactate under those specific pressures are at least about 1.7 g/cm$^3$. Corresponding solids densities of from at least about 1.8 to more than 2 g/cm$^3$ are particularly suitable. Again, the particular optimal density value to be provided depends to a certain extent on the formulation.

Contrary to expectations, the dispensability of the granulates, defined as the time taken to dispense a predetermined amount of material in a test apparatus, is promoted and not in the least impaired by relatively high compression levels and hence by relatively high solids densities. Obviously, fillings of relatively hard particles tend less to clump and also form less fines during the dispensing process which promotes the unimpeded flowthrough of water through the filling.

In addition to the application of optimal pressures in the roll gap, adjustment of the thickness of the sheet-form compactate is of importance for achieving the desired high powder densities of the ultimately granulated, free-flowing detergents. If the thickness selected for the compactate is distinctly smaller than the desired upper particle size of the granulated product to be produced, size-reduction of the sheet-form compactate initially obtained will produce tablet-like particles leading to fillings of high empty-space volume and hence comparatively low powder density. By contrast, with relatively thick compactates, subsequent size reduction produces particles the dimensions of which can approximate the basically desired ratio of 1:1:1. A granulometry such as this leads to relatively dense fillings having a maximum empty-space volume of around 50%. Although this value is still relatively high compared with fillings of spherical particles (where the corresponding values are normally about 35 to 45%), a slightly higher empty-space volume can also afford advantages in the context of the present invention insofar as it clearly promotes the dispensing process in the sense of an unimpeded flow of water through the filling.

Accordingly, the pressure applied in the roll gap and the residence time of the material under that pressure are adjusted to such high levels that a well-developed, hard sheet-form compactate of high density is obtained. Powder densities of the free-flowing material ultimately obtained of more than 900 g/l are desirable. The particular optimal pressure applied depends on the formulation.

The particular pressure to be applied is also limited, depending on the formulation, by the maximum permitted temperature in the sheet-form compactates above which water of crystallization for example is released, organic components are damaged, or the properties and structure of the zeolite used are altered by interaction with the surrounding constituents of the formulation. For formulations containing, for example, sodium silicate hydrate ($Na_2H_2SiO_4.4\ H_2O$,C5) and/or zeolite, the temperature limit in question is at around 45° to 50° C. Temperatures below 40° C. are preferably maintained.

The sheet-form compactate is then subjected to a size-reduction process to form granulated material having the desired particle size and particle size distribution. The size-reduction of the compacted sheet may be performed in a milling apparatus. The size-reduced material is then best subjected to a grading process. Overly coarse material is separated off and returned to the size-reducing machine, while overly fine material is added to the batch of powder-form mix and re-subjected to compaction in the roll gap.

The upper particle size limit desired for the final free-flowing granulate is from about 1.6 to 2 mm whereas, on the other hand, fines smaller than about 0.2 mm are undesirable. Accordingly, preferred free-flowing granulates have a broad particle size spectrum of from about 0.2 to 2 mm. It is preferred to produce sheet-form compactates having a layer thickness of at least about 1.5 mm after passage through the roll gap. The layer thickness here is preferably at least about 2 mm. Sheet thicknesses of the compactate of from about 4 to more than 10 mm may be particularly advantageous.

The prototype formulations for the components of the final compactates substantially correspond to those of earlier filed German patent application No. 36 24 336, although the teaching according to the present invention of incorporating separately prepared preagglomerates again allows considerable scope in this regard. The metasilicate is generally present in quantities of from about 20 to 75% by weight and preferably in quantities of from about 35 to 65% by weight, based on the mixture as a whole. The metasilicate may be used as an anhydrous product and/or in the form of hydrated phases containing certain predetermined and/or varying quantities of water of hydration. Suitable metasilicate phases containing water of hydration are known to be corresponding products containing 5 or 9 moles water of crystallization, particular significance being attributed to the corresponding metasilicate containing 5 moles water of crystallization. The combination of anhydrous sodium metasilicate (C0) and sodium metasilicate containing water of crystallization, more especially the corresponding product containing 5 moles water of crystallization (C5), may be used with particular advantage.

In addition to the principal components with their detergent effect, it is possible to use other auxiliaries, for example solubility promoters, foam inhibitors (for example paraffins), surfactants, particularly low-foam non-ionic surfactants, chlorine donors (for example trichloroisocyanuric acid), detergency enchancers, dyes and the like.

Compactates having a good detergent effect contain the individual active substances or groups of active substances in substantially the following quantitative ranges: 20 to 75% by weight Na metasilicate, 20 to 50% by weight STP and/or zeolite NaA, up to 20% by weight soda, up to 10% by weight Na waterglass, and up to 15% by weight of other additives to provide about 8 to 25% by weight total water.

In another embodiment, the present invention modifies the teaching of German patent application No. 36 24 336 and the teaching of the present invention to the extent that neither STP nor zeolite NaA is used at all in the production of the free-flowing alkaline detergents by compacting granulation. Accordingly, corresponding formulations contain essentially as their detergent components metasilicates which may be present in admixture with detergency-enhancing auxiliaries and, if desired (as described in said afore-mentioned patent application), together with soda and/or waterglass and other additives of the type described therein. Suitable detergency enhancers include the sodium salts of polymeric carboxylic acids widely used in modern fabric detergents, for example of homopolymeric acrylic acid (abbreviation AA-Na-salt) having a molecular weight (MW) of from 2,000 to 1,500,000 or of copolymers of acrylic acid and maleic acid in a ratio 4:1 to 1:1 having a molecular weight of 30,000 to 150,000, for example the commercial product "Sokalan CP 5", and/or the sodium salt of nitrilotriacetic acid (NTA). This class of detergency enhancers, which may be used in the detergent mixtures according to the invention in addition to and/or instead of STP and/or zeolite NaA, belong to the so-called co-builders class from fabric detergent compositions. They are distinguished, inter alia, by their ability to complex the salts responsible for water hardness.

In the case of non-phosphate or low-phosphate detergents, the composition of the pregranulates, which may be prepared by spray-drying in a tower, may read as follows (at least one of the constituents (b) to (e) having to be completely or partly present):

| | | |
|---|---|---|
| (a) | Sasil | 20-75% |
| (b) | STP | 0-40% |
| (c) | AA/MA—Na-salt | 0-30% |
| (d) | soda | 0-30% |
| (e) | NTA | 0-15% |
| (f) | $H_2O$ | 10-23% |

Small quantities of suspension stabilizers may also be present, being used in the preparation of aqueous, stable zeolite suspensions (master batches), for example small quantities of fatty alcohol ethoxylates and neutral salts, such as sodium sulfate. These additives are referred to as "minor components".

EXAMPLE I

A spray-drying tower premix containing zeolite NaA was prepared from the following components:

| | |
|---|---|
| STP | 37.00% |
| zeolite NaA | 43.55% |
| water | 19.45% |

1 ton per hour of a mixture consisting of

| | |
|---|---|
| $Na_2SiO_3$ anhydrous (CO) | 17.0% |
| $Na_2SiO_3 + 5H_2O$ (C5) | 40.0% |
| STP | 2.5% |
| Tower premix | 40.5% |

was fed to the paired rolls of a compactor (Bepex type MS 150) by a tamping screw. The pressure applied by the rolls was adjusted to a value of from 25 to 40 kN/cm in such a way that the temperature of the approx. 4 to 8 mm thick compactates issuing from the roll gap was between 30° and 35° C. The compactate was size-reduced in a hammer cage mill. The product obtained was sifted. Coarse particles were returned to the mill. The fines were returned with the fresh raw materials to the compaction process. The screened particle component was readily dispensed into a commercial domestic dishwashing machine (Miele G 503 S) in 20 to 25 minutes.

EXAMPLE II

A premix concentrate consisting of

| | |
|---|---|
| zeolite NaA | 71% |
| AA/MA—Na-salt | 8% |
| water | 20% |
| (rest, minor components) | |

was prepared in a spray-drying tower.

24 Parts of the premix were mixed with 27.3 parts C0, 27.3 parts C5, 16.3 parts STP and 1 part paraffin. The mixture was then compacted under a specific pressure of 16 kN/cm, size-reduced and screened. The product having a particle size of 0.2 to 1.6 mm showed good performance properties. The commercial product "Sokalan CP5" (molecular weight 70,000) was used as the AA/MA salt.

EXAMPLE III 31.8 parts of a spray-dried premix having the following composition

| | |
|---|---|
| zeolite NaA | 65.5% |
| AA/MA—Na | 15.4% |
| $H_2O$ | 18.5% |
| (rest, minor components) | |

were mixed with 16.2 parts C0 and 50 parts C5 and then compacted under a specific pressure of 16 kN/cm to form a compactate. A product having good performance properties was obtained by subsequent size reduction and screening to 0.2–1.6 mm and by treatment of 98% of the granulate with 1% paraffin oil 1% trichlorisocyanuric acid (TICA).

EXAMPLE IV

A premix consisting of 43.6 parts C5, 20.5 parts C0, 15.0 parts STP, 10.0 parts calcined soda and 10.9 parts AA/MA-Na-powder (92%) was compacted under a specific pressure of 16 kN/cm in a roll press and then size-reduced. After treatment with 1% TICA (chlorine donor), the screened particle component (0.2–1.6 mm) had a powder density of 967 g/l. The material was acceptable both in regard to dispensing time and in regard to residue behavior.

EXAMPLE V

A premix consisting of 53 parts C5, 15 parts C0, 9.5 parts calcined soda and 21.5 parts AA/MA-Na-powder (92%) was processed in the same way as described in Example I. The end product, which had a powder density of 904 g/l, was readily dispensable and showed favorable residue behavior.

EXAMPLE VI TO X

The compositions of other detergents prepared in accordance with the invention are shown in the following Tables. Table 1 shows the composition of the detergents as a whole, one of the components being referred to in each case as "premix".

The composition of these "premixes" is shown in Table 2. These premixes were prepared by spray-dry tower processing in accordance with the teaching of the invention. FA-EO-PO is a $C_{12}$–$C_{18}$ fatty alcohol reacted with 10 moles of ethylene oxide and 4 moles of propylene oxide. Blausprenkel is a 1:1 mixture of STP and C0 colored with a blue dye (ultramarine). The AA-Na-salt had a MW of 1,250,000.

TABLE 1

| Composition (% by weight) | Examples VI | VII | VIII | IX | X |
|---|---|---|---|---|---|
| Premix | 31.8 | 24.0 | 40.4 | 38.8 | 38.8 |
| C5 | 50.0 | 27.3 | 27.3 | 36.2 | 36.2 |
| CO | 16.2 | 27.3 | 27.3 | 24.0 | 24.0 |
| Soda | — | — | — | — | — |
| STP-S | — | 16.4 | — | — | — |
| Sokalan CP5 | — | — | — | — | — |
| Paraffin | 1.0 | 1.0 | 1.0 | — | — |
| FA—EO—PO | — | — | — | 1.0 | 1.0 |
| TICA | 1.0 | 1.0 | 1.0 | — | — |
| Blausprenkel | — | 3.0 | 3.0 | — | — |
| grams per liter | 905 | 973 | 959 | 882 | 924 |

TABLE 2

| Composition (% by weight) | Premixes of Examples VI | VII | VIII | IX | X |
|---|---|---|---|---|---|
| SASIL | 65.5 | 71.0 | 40.0 | 25.9 | 39.2 |
| AA—MA—Na-salt | 15.4 | 8.0 | — | 26.2 | 26.2 |
| Soda | — | — | — | 23.3 | 10.0 |
| NTA | — | — | — | 13.0 | 13.0 |
| AA—Na-salt | 0.15 | 0.15 | 0.10 | 0.05 | 0.10 |
| Sodium hydroxide | 0.45 | 0.45 | 0.20 | 0.15 | 0.25 |
| Water | 18.5 | 20.4 | 19.7 | 11.4 | 11.25 |
| STP | — | — | 40.0 | — | — |

The detergency of the roll compactates of Examples VI to X produced in accordance with the invention was determined on the test soils according to Th. Altenschöpfer, Seifen, Öle, Fette, Wachse, Number 23 and 24 (1972), pages 3 to 12.

The detergencies, as determined in a domestic dishwashing machine (Miele GS 540) using the universal program at 55° C. and water having a hardness of 16° Gh (160 mg CaO/liter), are shown in Table 3 below.

TABLE 3

| Soil | Examples VI | VII | VIII | IX | X |
|---|---|---|---|---|---|
| Tea | 10.0 | 10.0 | 10.0 | 10.0 | 10.0 |
| Milk | 8.8 | 8.8 | 8.5 | 9.5 | 9.7 |
| Minced meat | 6.0 | 6.5 | 6.2 | 7.3 | 7.5 |
| Pudding | 6.7 | 7.2 | 7.3 | 8.0 | 8.3 |

TABLE 3-continued

| Soil | Examples VI | VII | VIII | IX | X |
|---|---|---|---|---|---|
| Starch | 5.0 | 5.5 | 5.3 | 4.5 | 4.0 |
| Oat flakes | 5.0 | 5.0 | 4.8 | 4.8 | 5.0 |
| Overall average | 6.9 | 7.2 | 7.0 | 7.4 | 7.4 |

We claim:

1. In a process for the production of a granular, free-flowing alkaline detergent composition containing sodium metasilicate in intimate admixture with pentasodium triphosphate or finely divided crystalline zeolite NaA comprising mixing the starting components of the composition with one another in powder form, compacting the resulting mixture under pressure in a roll gap, and size-reducing the compactate obtained to the desired particle size, the improvement comprising that prior to the compacting step, agglomerating with one another at least two of the composition components to be compacted, and introducing the agglomerate to the composition to be compacted.

2. In a process as in claim 1 wherein said agglomerate has a lower density than said compactate.

3. In a process as in claim 1 wherein finely powdered composition components are included in said agglomerating step to form the agglomerate.

4. In a process as in claim 1 wherein said agglomerating step is perfomed by spray-drying said composition components.

5. In a process as in claim 1 wherein zeolite NaA and pentasodium triphosphate are present in said agglomerating step.

6. In a process as in claim 1 wherein a specific pressure of from about 10 to about 30 kN/cm roll length is applied in the roll gap during the compacting step.

7. In a process as in claim 1 wherein said compacting step is performed by passing said mixture under pressure in the roll gap of a pair of rolls rotating in opposite directions at substantially the same peripheral speed.

8. In a process as in claim 1 wherein said mixture is compacted to a sheet thickness of at least about 1.5 mm.

9. In a process as in claim 1 wherein said compactate has a density of at least about 1.7 g/cm$^3$.

10. In a process as in claim 1 wherein the size-reduced compactate has an average particle size of from about 0.2 to about 2 mm.

* * * * *